(12) United States Patent
Renner (10) Patent No.: US 7,620,459 B2
(45) Date of Patent: Nov. 17, 2009

(54) CONTROLLING AND OPERATING TECHNICAL PROCESSES

(76) Inventor: Peter Renner, Heiligenstock 2, D-51515 Kürten (DE)

( * ) Notice: Subject to any disclaimer, the term of this patent is extended or adjusted under 35 U.S.C. 154(b) by 0 days.

(21) Appl. No.: 11/071,067

(22) Filed: Mar. 3, 2005

(65) Prior Publication Data

US 2005/0197719 A1 Sep. 8, 2005

(30) Foreign Application Priority Data

Mar. 6, 2004 (EP) .................................. 04005388

(51) Int. Cl.
*G05B 11/01* (2006.01)
*G05B 15/00* (2006.01)
*G06F 19/00* (2006.01)
*G06F 13/00* (2006.01)
*G06F 15/173* (2006.01)
*G06F 9/44* (2006.01)
*G01F 17/00* (2006.01)
*G01F 23/00* (2006.01)

(52) U.S. Cl. ......................... 700/11; 700/121; 700/105; 700/1; 700/19; 700/17; 711/170; 709/223; 702/50; 717/105; 717/106; 717/110; 717/116

(58) Field of Classification Search .................. 700/17, 700/18, 19, 20, 83, 86, 87, 88, 11; 702/188, 702/189, 190, 183, 119; 345/810
See application file for complete search history.

(56) References Cited

U.S. PATENT DOCUMENTS

| 3,768,092 | A | * | 10/1973 | Dodds et al. ................... 345/18 |
| 4,663,704 | A | * | 5/1987 | Jones et al. .................... 700/83 |
| 5,479,643 | A | * | 12/1995 | Bhaskar et al. .............. 717/124 |
| 5,499,319 | A | * | 3/1996 | Al Janabi et al. ............... 706/1 |
| 6,064,812 | A | * | 5/2000 | Parthasarathy et al. ....... 717/105 |
| 6,088,665 | A | * | 7/2000 | Burns et al. .................. 702/188 |
| 6,144,954 | A | * | 11/2000 | Li .................................. 706/62 |
| 6,246,405 | B1 | * | 6/2001 | Johnson ........................ 715/764 |
| 6,311,101 | B1 | * | 10/2001 | Kastner ........................ 700/197 |
| 6,369,821 | B2 | * | 4/2002 | Merrill et al. ................ 345/473 |
| 6,388,657 | B1 | * | 5/2002 | Natoli .......................... 345/168 |
| 6,591,227 | B2 | * | 7/2003 | Koehler ....................... 702/183 |
| 6,608,638 | B1 | * | 8/2003 | Kodosky et al. ............. 715/771 |
| 6,690,981 | B1 | * | 2/2004 | Kawachi et al. ................ 700/83 |
| 6,865,926 | B2 | * | 3/2005 | O'Brien et al. ............. 73/23.27 |
| 6,963,814 | B2 | * | 11/2005 | Jones et al. .................. 702/119 |

(Continued)

OTHER PUBLICATIONS wikipedia definition for "elements of graphical user interface".*

(Continued)

*Primary Examiner*—Ramesh B Patel
*Assistant Examiner*—Sunray R Chang
(74) *Attorney, Agent, or Firm*—Joseph T. Guy; Nexsen Pruet, LLC (57) ABSTRACT

A system for operating and controlling technical processes having at least one component fashioned as a measuring instrument and a control device, which is connected by electrical lines to sensor and actuators of processes, and having a control program, a measurement and control unit, an operating and observation component, optionally a database, optionally a process printer and further components of a process automation, as appropriate, which are connected to one another via data channels and a control program.

26 Claims, 9 Drawing Sheets

U.S. PATENT DOCUMENTS

| | | | |
|---|---|---|---|
| 7,003,558 B2* | 2/2006 | Agrusa et al. | 709/223 |
| 7,031,800 B2* | 4/2006 | Bulgrin | 700/200 |
| 7,127,303 B2* | 10/2006 | Renner | 700/19 |
| 2002/0022895 A1* | 2/2002 | Genise et al. | 700/83 |
| 2002/0054149 A1* | 5/2002 | Genise et al. | 345/810 |
| 2002/0158598 A1* | 10/2002 | Oka | 318/560 |
| 2003/0033105 A1* | 2/2003 | Yutkowitz | 702/105 |
| 2003/0144997 A1* | 7/2003 | Hugley | 707/3 |
| 2004/0015418 A1* | 1/2004 | Dooley et al. | 705/28 |
| 2004/0073680 A1* | 4/2004 | Bauer et al. | 709/227 |
| 2004/0104941 A1* | 6/2004 | Natoli | 345/772 |

OTHER PUBLICATIONS wikipedia definition for "conditional programming".*
wikipedia definition for "if then".*
wikipedia definition for "graphical user interface".*

* cited by examiner

| Room Temperature Control – Application1 – Script – Room2 |
|---|

Room2 Procedure

Action: Set DigOut HeatingSystem1 = on

Action: Set VisuObject DisplayRoom2.Value = on

Test: If AnIn RoomTemperature >= 40 then

Action: Set AnOut Setpoint1 = 45

End test

Action: Wait 360000 ms

Action: Set AnOut Setpoint1 = 65

Action: Wait 700000 ms

Action: Set AnOut Setpoint1 = 35

Test: If AnIn RoomTemperature <= 40 then

Action: Set AnOut Setpoint1 = 0

Action: Set DigOut HeatingSystem1 = off     End test

Action: Set VisuObject DisplayRoom2.Value = off

End procedure

FIG. 5

| Room Temperature Control – Application1 – Script – Room3 |
|---|
| ⊟  Room3 Procedure |
|     Action: Set DigOut HeatingSystem1 = on |
| End procedure |

FIG. 6a

| Room Temperature Control – Application1 – Script – Room3 |
|---|
| Room3 Procedure |
| End procedure  |

Room Temperature Control – Application1 – Script – Room3

⊟ Room3 Procedure

Action: Set Object = var

End procedure

FIG. 6d

Room Temperature Control – Application1 – Script – Room3

⊟ Room3 Procedure

Action: Set Object = var

End procedure

| Variable ▶ |
| Parameter Object |
| Visu. Object |
| Channel ▶ |
| Report Field |

| Analog Output |
| Digital Output |
| COM Channel |
| Virtual Channels ▶ |

FIG. 6e

| Room Temperature Control – Application1 – Script – Room3 |
|---|
| ⊟ Room3 Procedure |
|     Action: Set DigOut <u>ChannelName</u> = <u>var</u> |
| End procedure |

FIG. 6f

| Room Temperature Control – Application1 – Script – Room3 | |
|---|---|
| ⊟ Room3 Procedure | |
|     Action: Set DigOut <u>ChannelName</u> = <u>var</u> | |
| End procedure | HeatingSystem1<br>HeatingSystem2 |

FIG. 6g

| Room Temperature Control – Application1 – Script – Room3 |
|---|
| ⊟  Room3 Procedure |

Action: Set DigOut HeatingSystem1 = <u>H/L</u>

End procedure

FIG. 6h

| Room Temperature Control – Application1 – Script – Room3 |
|---|
| ⊟  Room3 Procedure |

Action: Set DigOut HeatingSystem1 = on

End procedure

FIG. 6i

CONTROLLING AND OPERATING TECHNICAL PROCESSES

BACKGROUND OF THE INVENTION

The invention relates to a method of operating and controlling technical processes. A large group of products, used chiefly for controlling machines, is generally known. They are known as stored-program controllers or programmable logic controllers (PLCs). These devices are equipped with governing control programs that have the task of controlling machines and installations (processes) through sensors and actuators. Visualization software independent of the control software is employed for operator guidance. Control software and visualization do not fit together because they are different in concept, relate to different platforms, so that these approaches are not consistent. This manifests itself in an inadequate adaptation to the differentiated requirements of the distinct processes. In practice, this often leads to problems and complicated approaches.

There is further known a group of products that are employed primarily in research and development. They date back to the end of the 1980s, when PCs had attained a sufficient level of performance, chiefly of graphical capabilities. These are the so-called virtual measuring instruments. Measuring instruments with knobs, buttons, switches and indicating instruments had been known up to that time. Measuring circuits were physically constructed from wire and filters and the like. This was now replaced by virtual measuring instruments and measuring circuits. Now there were images of such devices on the screen. Turning knobs and actuating buttons and switches was replaced by clicks of the mouse. In this way a process could be operated and observed.

Automatic control, however, was not possible in this way. In order to remedy this defect, a programming language was superimposed thereover. In the opinion of many users, the institution of automation on the basis of such approaches is very complicated and demands a long familiarization time. Users need special knowledge, which they must master. The effort is substantial. Consistency between operating and observing and automation was not achieved with these approaches. Particularly in laboratory automation, it would be very advantageous if there were simple approaches making it possible to develop automation tasks quickly and without great effort, without the need for special knowledge or the employment of specialists.

SUMMARY OF THE INVENTION

It is an object of the invention to remedy the before mentioned shortcomings. In order to effect the distinct tasks, a method is furnished that integrates the various components of process automation, such as control program, process visualization, specification of parameters and documentation, into a consistent method. The user is enabled to configure control sequences, so that there is no need of programming and the learning of a programming language. The object of the invention is achieved in that:

A. the control modules are invoked and invoke other control modules according to simple rules, B. a start module being started by a program invocation and in turn being able to invoke a sequence module or a function module, C. a sequence module being invocable by a start module, another sequence module or an event module and being able in turn to invoke a further sequence module, a function module or an end module, D. a function module being invoked by a sequence module, a start module, an end module or an event module, E. an event module being started by an event that takes place in the process or by an operator action and in turn invoking a sequence module, a function module or an end module, and F. an end module being invoked by a start module, another sequence module or an event module.

The data exchange between the components is effected with standard transmission protocols that allow the individual components either to be run on one device or to be distributed among various devices. The devices can then be subscribers of a standard data network, for example Ethernet. In this way, applications can be conceived that permit advantages in terms of effort and operational organization, because the data network of an enterprise can also be utilized for the tasks of automating processes.

A further inventive concept is concerned with control sequences. First, the overall sequence of process control is split into control modules, these control modules being assigned to the sequences, events and functions categories, and these control modules being containers for program code. Three types of control modules result, namely, sequence modules, event modules and function modules.

The sequence module, as the name expresses, is responsible for the temporal sequencing of various activities. It takes over the process guidance. Process guidance means the control program of the process sequence. This will be explained for the example of a mixing process. In a mixer, the process sequence results from controlling the charging of the species that are to be mixed, the heating of the mixing stock through temperature control, through rotation speed control of the stirrer and mixing time, emptying of the mixer, and cleaning.

The event module handles operations that affect process guidance and can take place at a time that cannot be determined in advance. As soon as the event takes place, activities are initiated that affect the sequence. For example, the event can be the attainment of a temperature of a heating operation. A further example would be an operator action via the operating and observation component in which the operator changes the setpoint of a controller. Event modules can either momentarily interrupt the sequence and themselves take over process guidance during the interruption, or be executed in parallel with the sequences.

A characteristic of the function modules is that they take over activities that run in parallel with other control modules. In the filling of a vessel, for example, a plurality of species can be charged at the same time, the filling operation of the individual species being controlled by one function module each. Function modules are usually invoked by sequence modules, less frequently by event modules. Typical further operations that are executed by function modules are control actions, heating operations, monitoring operations, etc. Function modules can acquire measurement data, which are depicted in the form of trend curves on the operator interface. Function modules open up opportunities for optimizing the process sequence. Control programs can be more fully and easily understood in terms of function modules.

One category of technical processes is referred to as batch processes or discontinuous processes. The characterizing feature of such processes is a start phase and an end phase (termination of the process). An example would be a pumping station, which is turned on as soon as a water reservoir is to be filled. Starting operation and termination are to be assigned to the sequences category. For this reason, it is desirable to provide a start module type and an end module type in the sequences category. This typization is not mandatory, because a sequence module could also control starting operation and termination.

As a consequence of this definition, the sequences category includes the three module types, namely, start module, sequence module and end module. In the case of process sequences, critical states not provided for in the normal operating sequence can occur. For example, suppose a controller is malfunctioning so that a temperature exceeds a critical limiting value. For safety reasons, it is then often necessary to terminate the process. This is referred to as emergency termination. According to the invention, therefore, a security module is defined. The security module reacts to events that do not happen in the normal operating sequence. It is therefore assigned to the events category. The security module has the task of interrupting the normal process sequence and terminating the process. As a consequence of this definition, the events category includes the module types event module and security module.

Distinct graphical symbols are assigned to the various module types. These graphical symbols are clearly distinguishable from one another. In the operating and observation component, which can contain a number of screens, module diagrams are provided. A user creates module diagrams in configuration mode. In this way, a very good overview of the process sequences is advantageously made possible. The control modules are placed as graphical symbols in the module diagram and linked with lines. These lines show symbolically how control modules are invoked by other control modules and can themselves invoke other control modules. The arrangement of the symbols and the linking lines, which are subject to set rules, make it possible to identify at a glance the structure and the sequences of the automation task. According to the invention, the control modules whose program contents are currently being carried out are highlighted in runtime mode, that is, during the execution of a process. In this way an observer can identify in what stage the process sequence is.

The control modules are linked in accordance with set rules. The software checks whether the user is complying with these rules, so that errors are largely avoided. These rules state that control modules of the sequences category (sequence modules, start modules and end modules) are linked only vertically, that event modules and security modules are not invoked by other control modules but can invoke other control modules, that function modules are linked horizontally with the invoking control module.

It is important to note that the linking lines in the case of vertically arranged control modules must also allow of a lateral offset, that the linking lines in the case of horizontally linked function modules must also allow of an offset in the vertical direction, depending on how the control modules are arranged in the module diagram. This becomes apparent from the images in the examples.

A user will desirably arrange the control modules from top to bottom in a manner corresponding to the program procedure. It is regarded as self-explanatory that the respective directions vertical and horizontal are interchangeable. The simple rules with which control modules are invoked and invoke other modules, symbolized by the linking lines between modules, and the fact that the invention makes it possible to get by with only a very few distinct module types should be emphasized. The modules serve as virtual containers for program code. They are accessed for example by double-clicking on the symbol of the control module in the module diagram. An interface containing the program code of the control program then opens, and the program code can now be edited.

The individual instructions of the control program contain keywords serve as placeholders for further keywords and elements of program code. The keywords in the code of the control program, which are emphasized in clearly visible fashion, for example by underscoring and/or color coding, must necessarily be replaced by program code. Only when all keywords have been replaced by program code is the control program of the control module released as finished.

According to one embodiment of the invention, the keywords permit access to selection lists. By clicking on the keyword, the selection list associated with the keyword is opened in simple fashion. The contents of the individual list items of the selection list in question are formulated such that they generate a meaningful and error-free program code when they replace the keyword. It is therefore necessary that all keywords must be replaced by a program code. Only when all keywords have been replaced by a program code is the control program of the control module released as finished. Thus, if a list item is selected from the selection list, this list item automatically replaces the keyword.

Because of this way of creating program code, a user has no need to learn the language. Aside from the values of constants, he writes no program text. The program text is automatically generated with the aid of the computer mouse; as a consequence, syntax errors are eliminated. Further, illogical or meaningless program sequences are eliminated, because the selection list as replacement for the keyword in question makes possible only meaningful and logical entries. This implies that error messages, such as are always necessary otherwise, do not happen. With the exception of an error message that appears if not all keywords have been replaced.

All program instructions are assigned to the test or action categories. In this way, the first keyword of a program instruction is either Test or Action. A different word with the same meaning can also be chosen. Thus it is made very easy for the user to take a decision if he wishes to write a new line of the program. As soon as he inserts a new line, the Test and Action appear in the selection list. A click on one of the two selection items inserts either the Test or Action program instruction. This contains further keywords, so that the program instruction can be prepared with several steps of the same selection procedure.

Process states, operator actions, input parameters can be determined with the Test instruction. For example, it is possible to perform a test to determine whether a temperature has exceeded a certain value, whether a vessel is full, whether an article of equipment is turned on, whether a button has been actuated, and much else. The Test instruction has the straightforward formulation >If (logical operation) then<. Options for the Test instruction being possible in the form >If not then . . . <or >If for the first time then . . . <.

The Action instruction makes possible a wide variety of operations that can be assigned to the categories of process control, items of information for operating personnel, storage of data (documentation), mathematical operations (formulas), programming operations (e.g., the "loop" example), output in reports.

BRIEF DESCRIPTION OF THE DRAWINGS

Exemplary embodiments of the invention are depicted in simplified form in the accompanying drawings, in which.

DETAILED DESCRIPTION OF THE INVENTION

Figure 1:
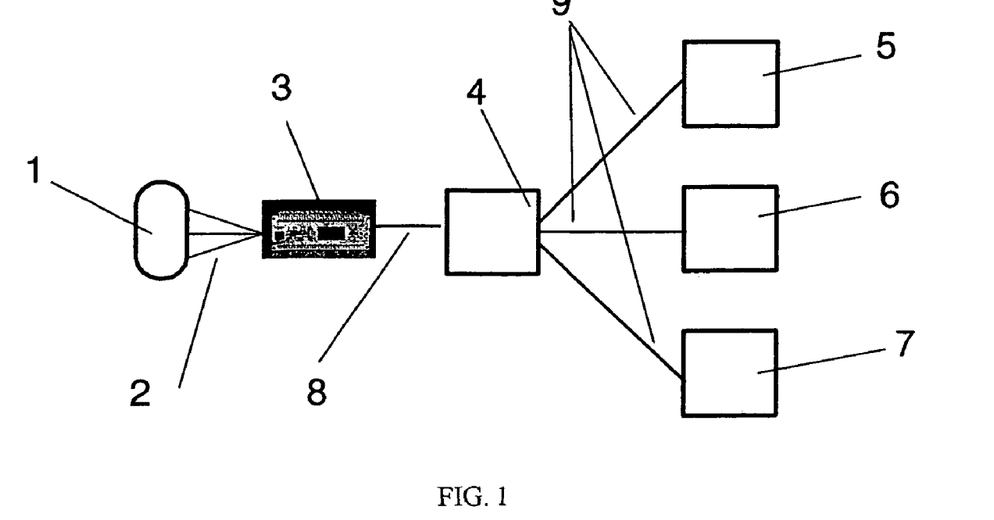
FIG. 1 shows a schematic arrangement of the components of process control.

The reference characters in FIG. 1 have the following meanings:
- 1: a process to be controlled;
- 2: sensor and actuator lines, which link the sensors and actuators of the process with the measurement and control units;
- 3: a measurement and control unit;
- 4: a control program;
- 5: an operating and observation component;
- 6: a database;
- 7: a printer for creating reports;
- 8: a data channel; and
- 9: data channels.

Process 1 of FIG. 1 is linked to a measurement and control unit 3 via measurement and control lines 2. The measurement and control lines 2 transport signals of the sensors of process 1 to a measurement and control unit 3 and transport control signals in the reversed sense to the actuators of process 1. The measurement and control unit 3 is both a measuring instrument and a data-processing device. It makes certain that the process signals are transformed in such fashion that the data can be exchanged with a control program 4 via a data channel 8. The control program 4 is linked to the other components of the system, that is the operating and observation component 5, the database 6 and the printer 7 (for creating reports) via data channels 9. Data transfer via the data channels 8, 9 is effected with the Ethernet hardware protocol and the TCP/IP software protocol. As a result, the individual functions can be implemented in one device or in distributed fashion over a plurality of devices. A high degree of flexibility is attained in adaptation to the spatial relationships in question and to the size of the application in question.

The control program 4 stands at the center of data transfer because it is linked in star fashion to other components 3, 5, 6 and 7 via data channels 8, 9. As a result, the control program 4 can send data for observation of the system, under program control, to the operating and observation component 5, where process states are displayed to the operator. Conversely, operator actions by the operator are supplied to the control program 4, which in turn, on the basis of the instructions, initiate corresponding state changes in process 1. Also, the control program 4 can exchange data with the database 6. On the one hand, it can read out process parameters, process them in the control the program, and control process 1 accordingly. Conversely, data for quality validation can be passed on to the database 6. Report printer 7 will receive data via one of data lines 9 and can then create reports.

Figure 2:
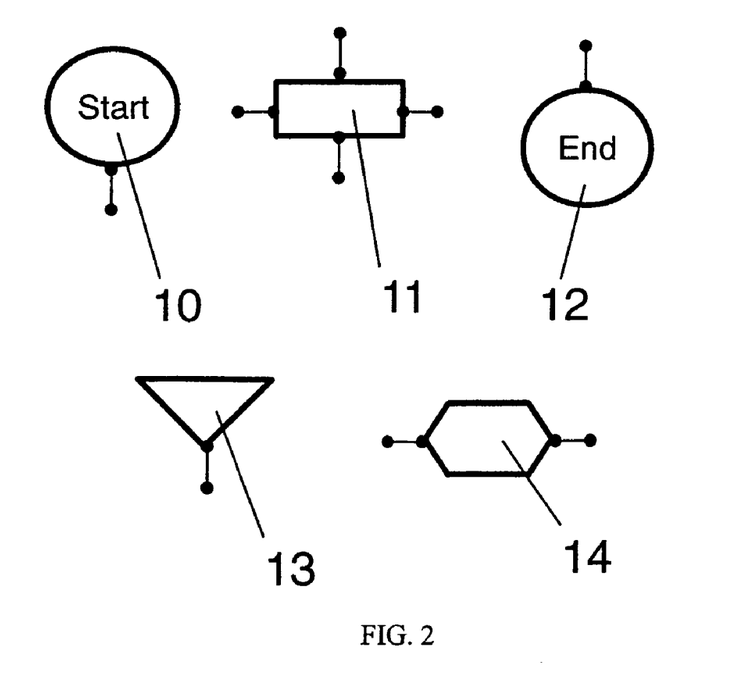
FIG. 2 shows symbols representing the three categories, namely, sequence modules, event modules, function modules.

Referring to FIG. 2, the reference characters have the following meanings:
- 10: the symbol of the start module of the sequences category;
- 11: the symbol of the sequence module of the sequences category;
- 12: the symbol of the end module of the sequences category;
- 13: the symbol of the event module of the events category; and
- 14: the symbol of the function module.

The symbols in FIG. 2 represent control modules. They can be put on the interface in the module diagram, arranged and linked or joined with lines. In this way the framework of the control program can be conceived. A click on the module in question gives access to the program code of the control program. The symbols show how they can be joined to other symbols. Sequence module 11 can be joined vertically to other sequence modules or to the start module and an end module. It can be joined horizontally to function modules. Event module 13 can invoke only a sequence module or an end module. It cannot, however, itself be invoked by another module. Function module 14 can be invoked only by a sequence module but cannot itself invoke another module.

Figure 3:
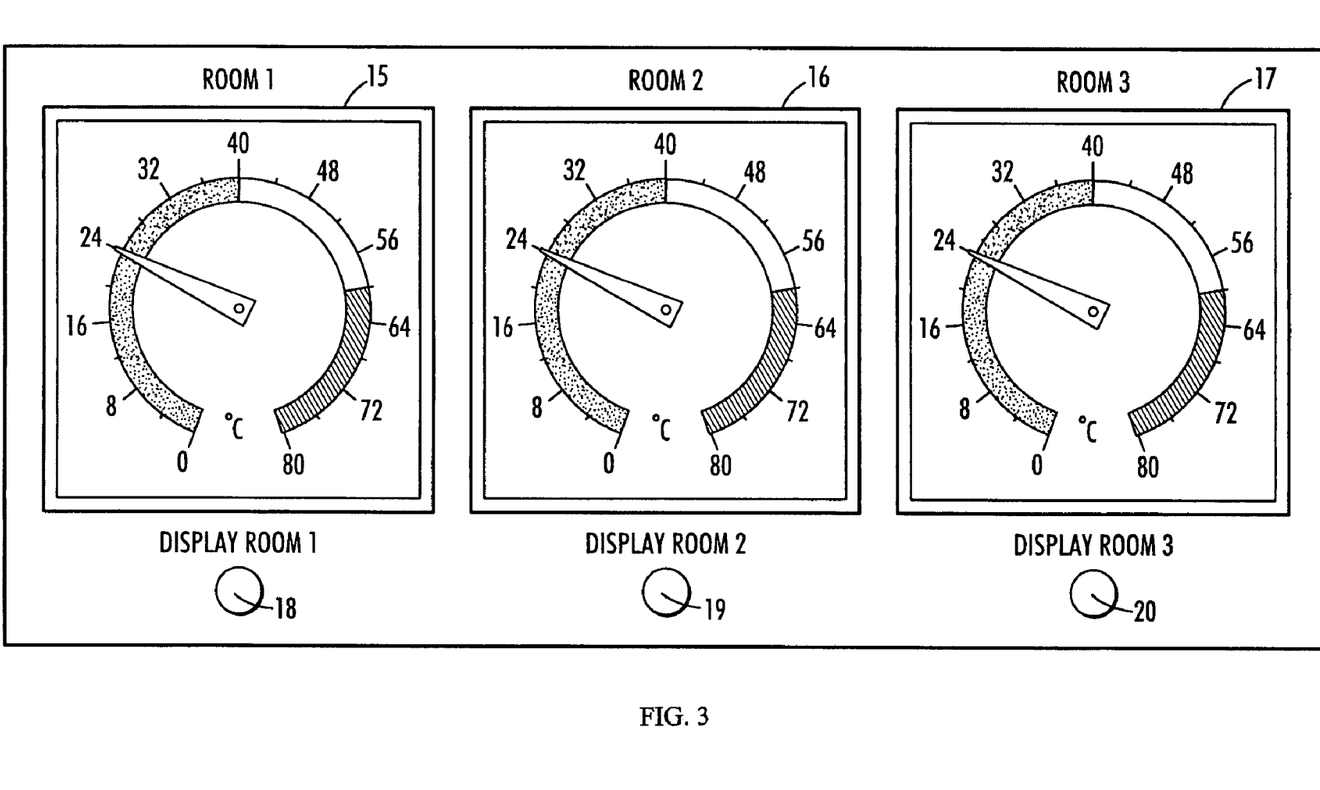
FIG. 3 shows an excerpt from a visualization diagram.

The reference characters in FIG. 3 have the following meanings:
- 15, 16, 17: visualization objects of analog display devices; and
- 18, 19, 20: visualization objects of signal lights.

The three (virtual) analog display devices 15, 16, 17 of FIG. 3 show the temperatures of three rooms designated as Room1, Room2 and Room3. The (virtual) signal lights indicate in which of rooms 15, 16, 17 the temperature is currently being controlled in accordance with a temperature profile.

Figure 4A:
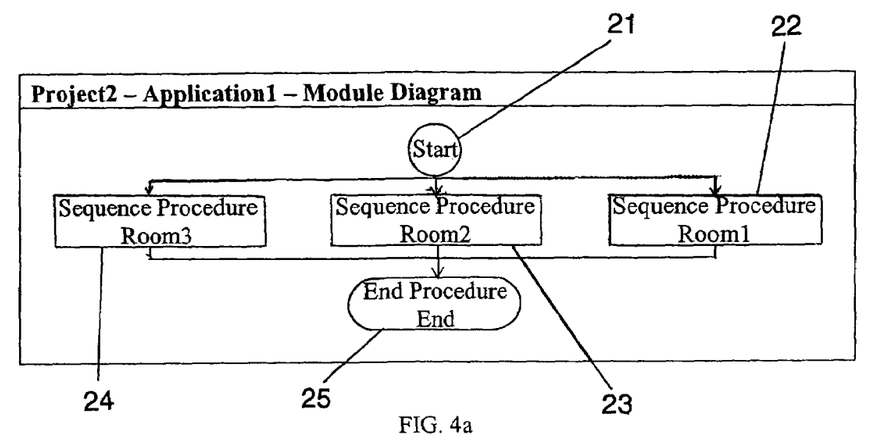
FIG. 4a shows a module diagram.

The reference characters in FIG. 4a have the following meanings:
- 21: a start module;
- 21, 23, 24: sequence modules; and
- 25: an end module.

Figure 4B:
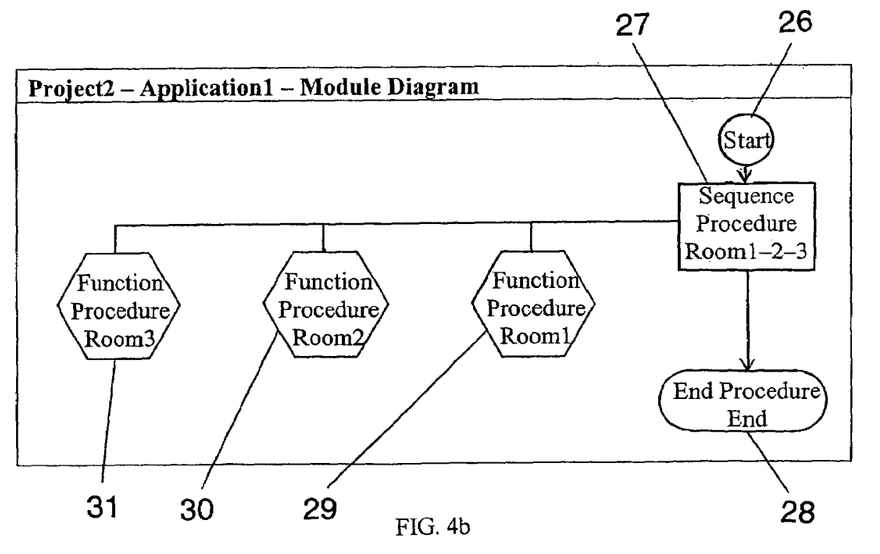
FIG. 4b shows a module diagram.

The reference characters in FIG. 4b have the following meanings:
- 26: a start module;
- 27: a sequence module;
- 28: an end module; and
- 29, 30, 31: function modules.

The function according to FIG. 4a and FIG. 4b is next described in both of the module diagrams shown in FIG. 4a and FIG. 4b, three climate-controlled rooms are represented by symbols 23, 24, 25 and 29, 30, 31. The temperature is being controlled in the climate-controlled rooms. The salient difference is that in module diagram of FIG. 4a only one room 23, 23, 24 can be controlled at a time, while in module diagram of FIG. 4b the rooms can be controlled at the same time. The reason for the difference is that control in FIG. 4a is effected by sequence modules 22, 23, 24, while in FIG. 4b the control is brought about by three function modules 29, 30, 31.

In using the sequence modules in FIG. 4a, only one of these modules can function at a time, because the sequence module takes over process guidance. In FIG. 4b, this task is entrusted to three function modules 29, 30, 31. Function modules work in parallel and independently of one another. The rooms can thus be controlled at the same time. In FIG. 4b, sequence module 27 takes over process guidance. Its only function is to wait while the rooms are controlled by function modules 29, 30, 31.

Figure 5:
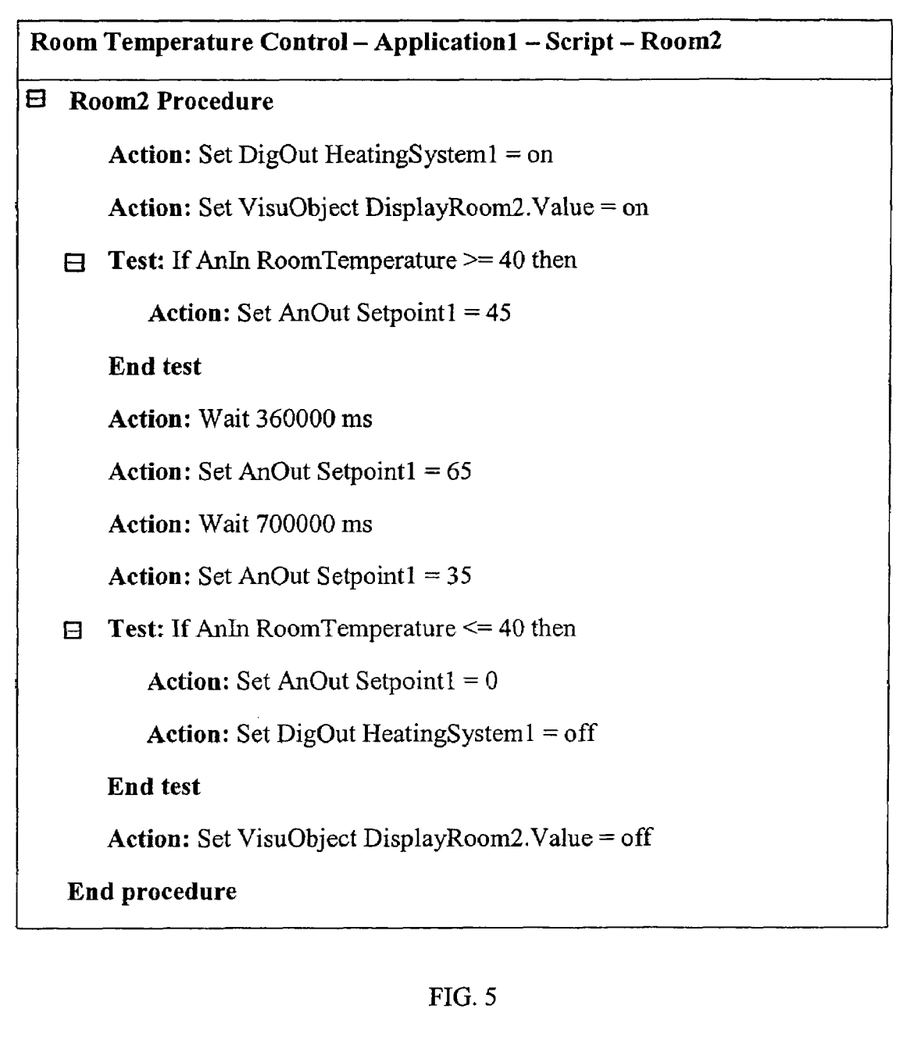
FIG. 5 shows a finished program code of a module.

FIG. 5 shows the finished program code of the sequence module 23 and of the function module 30. The temperature is first controlled at 45° C. during a defined time, then at 65° C., likewise during a fixed time interval. Afterward there is a regression to room temperature. The individual program instructions belong exclusively to the test and action categories. The Test instruction is a block of instructions made up of two lines in which Action instructions are commonly included. The Action instruction in the second line turns on a digital channel (HeatingSystem1) of the connected process.

Further Action instructions and Test instructions correspond to the process. The Action instructions in the third line from the top and in the next to last line correspond to the visualization object DisplayRoom2 (reference character 19 in FIG. 3) and turn the signal lights on and off.

Figure 6A:
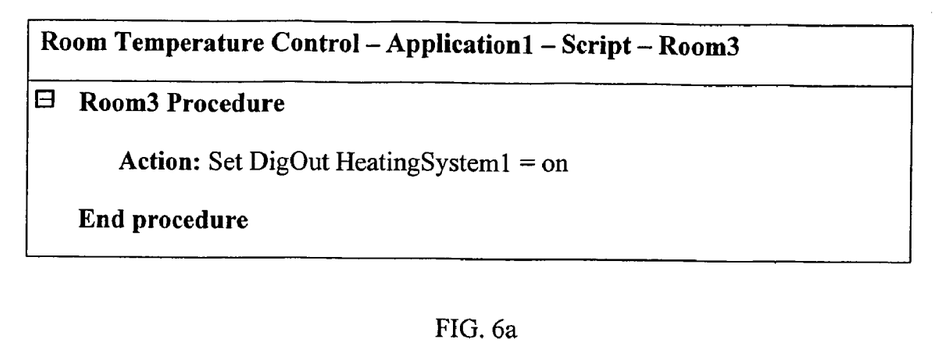
FIG. 6a to FIG. 6i show interactive creation of a program instruction.
Figure 6B:
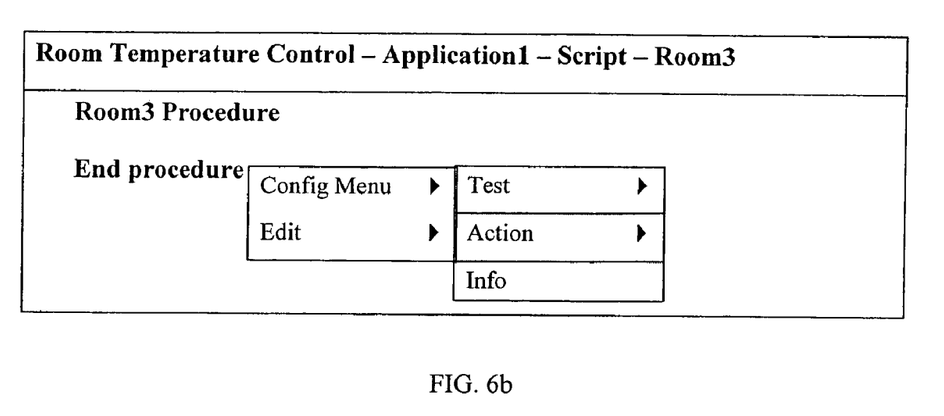
Figure 6C:
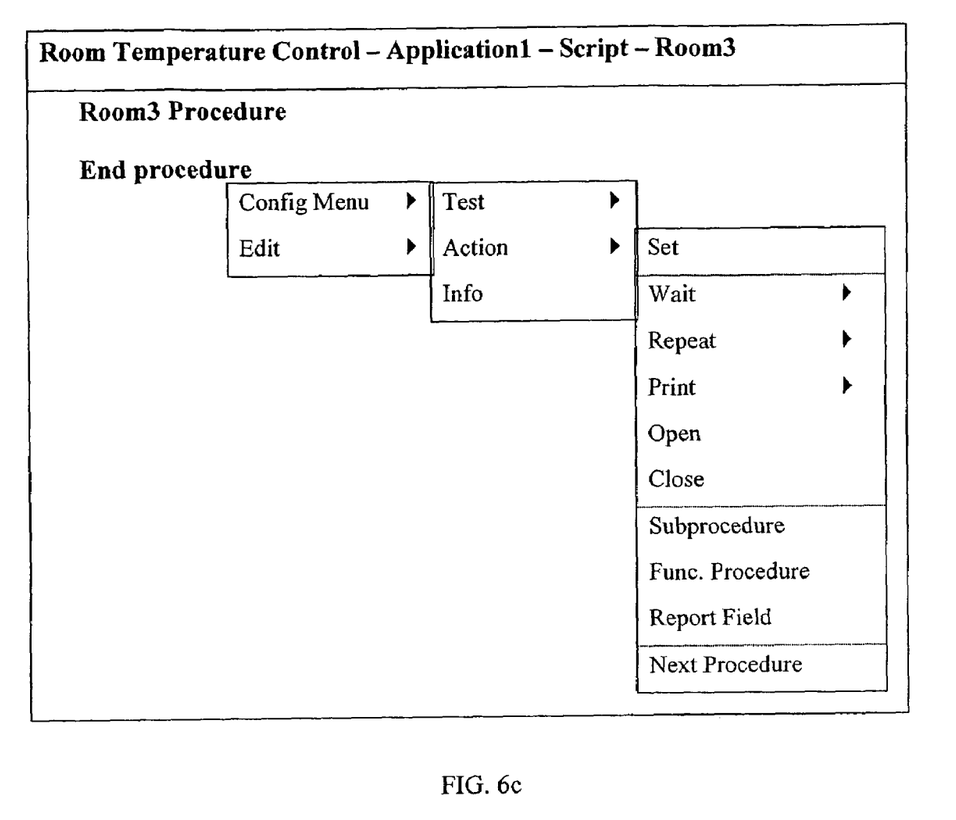

FIG. 6a shows the finished Action instruction created interactively by clicking the mouse. The instruction causes the digital output of type DigOut, with the name HeatingSystem1, to be set to an "on" status. FIG. 6b shows how the instruction is set up if a free line is not yet available. The mouse pointer is moved onto the line below the line to be inserted. Clicking the right mouse button causes the selection list Test/Action/Info to open as shown in FIG. 6b. Action is selected. Referring to FIG. 6c, clicking the left mouse button causes Set to be selected from the Action/Set selection list.

Figure 6D:
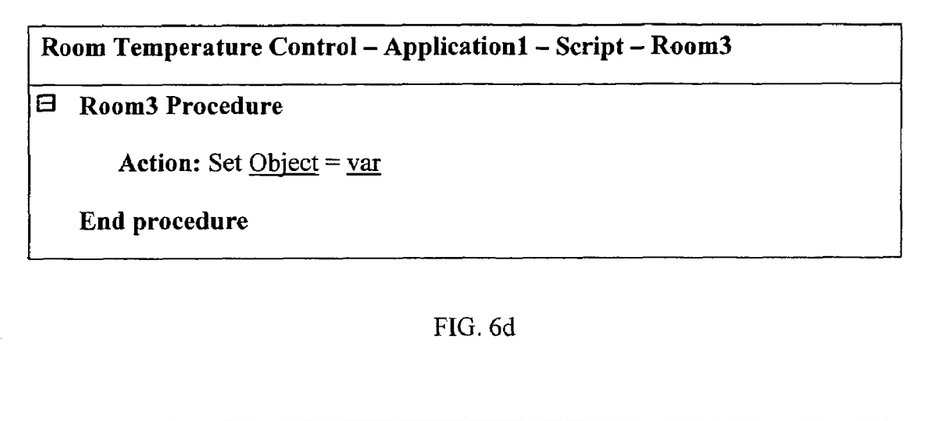
Figure 6E:
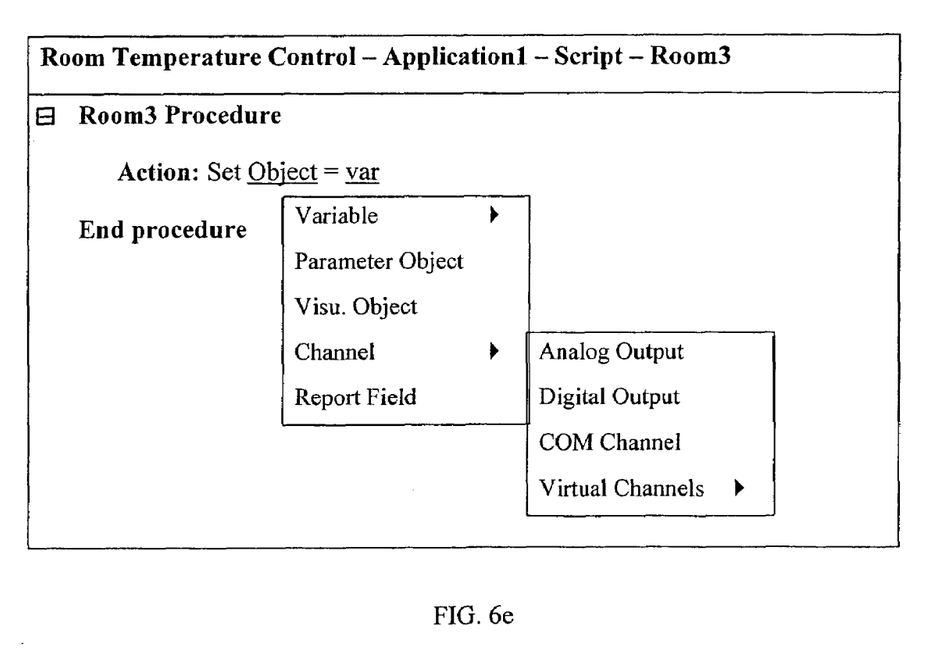
Figure 6F:
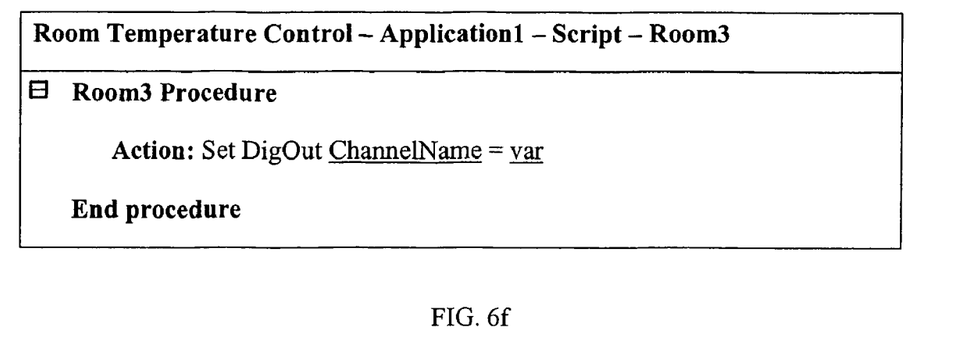

Referring to FIG. 6d, the instruction still shows the underscored keywords Object and var. According to the rules, all keywords must be replaced by program code. In the FIG. 6e, the left mouse button is clicked on the keyword Object. The selection list opens as a result. Channel and Digital Output are selected. The instruction has the appearance shown in the FIG. 6f, with the keywords ChannelName and var still underscored.

Figure 6G:
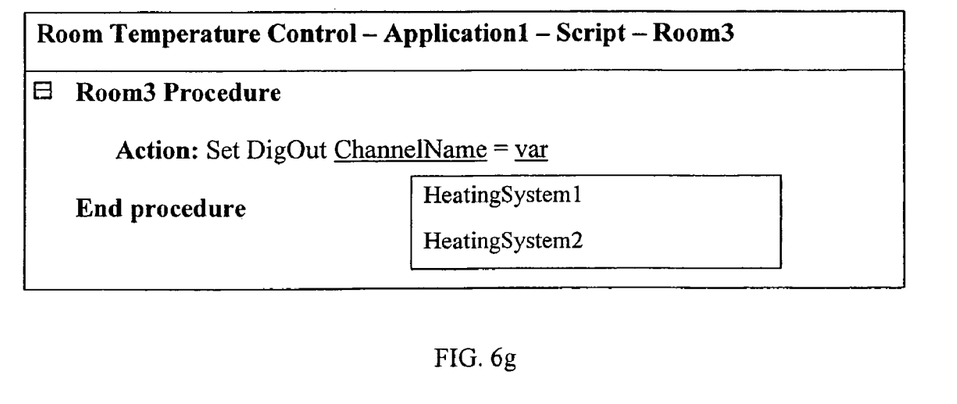
Figure 6H:
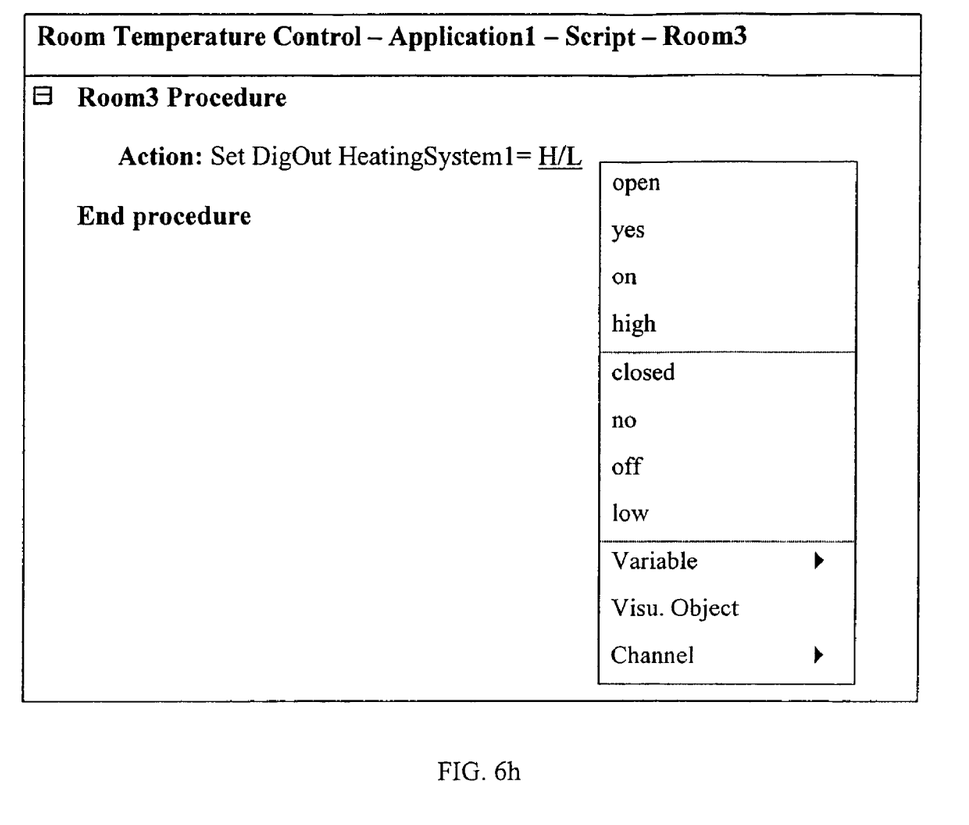
Figure 6I:
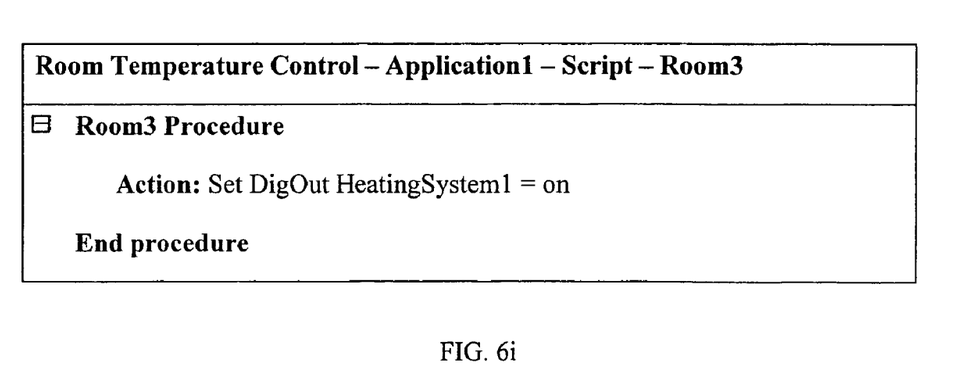

Referring to FIG. 6g clicking on the keyword ChannelName causes the available channels to be displayed. "HeathingSystem1" is selected. FIG. 6h shows that clicking on the keyword "var" causes "Heating System 1" to be replaced by H/L. Clicking on H/L causes the selection list to open as shown in the FIG. 6h. "On" is selected and FIG. 6i shows the finished instruction, which was generated by a few clicks of the mouse.

What is claimed is:

1. A control system for a technical process comprising:
    a measurement and control unit,
    sensors and actuators controlling said technical process connected by lines to said measurement and control unit,
    a program unit comprising control modules and instructions;
    an operating and observation unit having a screen and a keyboard for data input and being linked via a data channel to said program unit whereby data is exchanged between said program unit and said operating and observation unit, and wherein control of said technical process is effected by an operator inputting control instructions into said program unit via said measurement and control unit,
    wherein said control modules are called in a run time mode and said control comprises elements selected from sequence elements, event elements and function elements;
    wherein said sequence elements provides process guidance and functions in sequence and said sequence element comprises start module, sequence module and end module;
    wherein said event elements run independent of said sequence elements and said event elements comprise event modules and security modules;
    wherein said function elements run parallel to said sequence elements and can be addressed by at least one of said sequence element or said event element;
    wherein said technical process can be controlled by said operator in a configuration mode wherein an order of operation of said control module elements can be altered graphically and said technical process alters function in response to said order of operation;
    wherein during operation said control system can access a program unit which can, in turn, initiate said start module and at least one element of said control module;
    wherein said start module initiates said sequence module wherein each sequence module is processed sequentially and each sequence module can activate a second sequence module of said sequence modules; said function element or said end module,
    wherein said function element can be initiated by a process incident and can initiate a sequence module, function module or end module; and
    said end module activatable by one of said start module, said sequence module and said event module.

2. The control system of claim 1 including a transmission system effecting data exchange between components via data channels.

3. The control system of claim 1 wherein said control program is structured with control modules assigned to the categories sequences, events and functions, and said control modules are containers for program code.

4. The control system of claim 1 wherein said sequence modules take over process guidance, wherein they are responsible for a control program of chronological sequence of predetermined activities.

5. The control system of claim 1 wherein there are at least two sequence modules working in parallel, only one of said sequence modules being invocable at any one time.

6. The control system of claim 1 wherein the event modules are initiated by defined events that take place in said technical process sequence and momentarily interrupt said process and take over process guidance during the interruption.

7. The control system of claim 1 wherein the event modules are initiated by defined events that take place in a process sequence and are executed in parallel with said process sequence.

8. The control system of claim 1 wherein said function modules perform tasks executed in parallel with process sequences.

9. The control system of claim 1 wherein the event category modules include event modules and security modules and wherein event modules initiated by process events perform assigned tasks and security modules terminate processes in controlled fashion upon occurrence of an extraordinary event.

10. A system for controlling, operating and observing a technical process comprising:
    a measurement and control unit;
    sensors and actuators linked to said measurement and control unit wherein said technical process is controlled by said sensors and said actuators;
    a unit comprising a control program linked to said measurement and control unit;
    an operating and observing component linked to said unit;
    a configuration mode capable of developing an application;
    a runtime mode capable of controlling, operating and observing said technical process;
    wherein said unit communicates by means of control commands from said system or an operator with said measurement and control unit and said operating and observing component in order to control said technical process and to enable the operation and observation of processes;
    said control program being structured in control modules, the control modules being divided into the categories selected from sequence modules, event modules and function modules and said control modules each contain program code;

said sequence modules being linked sequentially wherein said sequence modules control a temporal sequence and thus take over process guidance, said event modules controlling occurrences that can occur at various points in said process and initiate specific activities that influence further sequence of said process and wherein said event categories can contain said event modules and security modules wherein said event modules are initiated by events that perform associated tasks and wherein said security modules can halt processes in controlled fashion in case of extraordinary events; and said function modules control occurrences that can be processed in parallel with said sequence modules and wherein said function modules are capable of being invoked by any sequence module, said start module, said end module or said event module.

11. The system for controlling, operating and observing a technical process of claim 10 wherein said sequence modules comprise at least one of a sequence module type, a start module and an end module.

12. The system for controlling, operating and observing a technical process of claim 10 wherein said event modules comprise at least one of an event module type and a security module.

13. The system for controlling, operating and observing a technical process of claim 10 wherein said function modules comprise a function module type.

14. The system for controlling, operating and observing a technical process of claim 10 wherein:

said control modules are invoked and invoke other control modules according to predetermined rules;

a start module being staffed by said control modules and being capable of invoking at least one of a second sequence module; second function module and said end module;

said second sequence module invoked by said start module being capable of invoking a second start module, a third sequence module, a second event module and being capable of invoking a further sequence module a further function module or an end module;

an event module invoked by an event that takes place in a process and being capable of invoking an additional sequence module, an additional function module or an additional end module;

said end module being capable of being invoked by said start module, any sequence module or any event module.

15. The system for controlling, operating and observing a technical process of claim 10 wherein distinct graphical symbols are associated with each of said function module, said event module, an end module, said sequence module, a function module, a start module, and said control module.

16. The system for controlling, operating and observing a technical process of claim 10 further comprising module diagrams capable of interface by a user for development of a configuration mode of a process sequence structure;

wherein said control modules are capable of being positioned as graphical symbols and linked with lines in said module diagram wherein said lines illustrate graphically how control modules can be invoked by other control modules and can themselves invoke other control modules and wherein the disposition of symbols and said linking lines are subjected to predetermined rules supported by a computer program.

17. The system for controlling, operating and observing a technical process of claim 10 further comprising a module diagram wherein said sequence modules can be disposed in parallel fashion in said module diagram with only one sequence module being capable of being invoked in one pass.

18. The system for controlling, operating and observing a technical process of claim 10 further comprising module diagrams wherein said sequential modules are disposed predominantly vertically and said function modules predominantly horizontally in said module diagrams.

19. The system for controlling, operating and observing a technical process of claim 10 wherein data exchange takes place between said components via data channels under standard transmission protocols.

20. The system for controlling, operating and observing a technical process of claim 10 wherein further comprising module diagram comprising a line wherein clicking below said line inserts a new line, a selective list appears, an uncompleted program instruction comprising at least one keyword appears upon a choice of a list item.

21. The system for controlling, operating and observing a technical process of claim 10 further comprising program instructions wherein said program instructions are completed in that keywords in complete instructions are replaced with further keywords or finished program text with aid of selective lists, said keywords serving as placeholders for further keywords and finished elements of said program code.

22. The system for controlling, operating and observing a technical process of claim 21 wherein said keywords are tied to associated menus.

23. The system for controlling, operating and observing a technical process of claim 21 wherein contents of individual items of a menu are formulated such that when they replace a keyword error-free codes are presented.

24. The system for controlling, operating and observing a technical process of claim 21 wherein selected keywords and elements of program code replace said keyword and wherein replacing said keyword is continued until all keywords have been replaced with finished program text.

25. The system for controlling, operating and observing a technical process of claim 10 further comprising program instructions wherein said program instructions are so formulated that they are associated with a test or action categories.

26. The system for controlling, operating and observing a technical process of claim 25 wherein by means of said test category it is possible to query states that belong to categories process states, operator actions and input parameters, wherein by means of said action categories process control, information for operating personnel, saving of data, mathematical operations, programming operation and output reports.

* * * * *